United States Patent [19]

Sun

[11] Patent Number: 4,973,033

[45] Date of Patent: Nov. 27, 1990

[54] AIR OPERATED VICE

[76] Inventor: Hei W. Sun, No. 19, Alley 28, Lane 851, Chung Shan Rd., Shen Kang Hsiang, Taichung Hsien, Taiwan

[21] Appl. No.: 443,404

[22] Filed: Nov. 30, 1989

[51] Int. Cl.⁵ .............................................. B23Q 3/08

[52] U.S. Cl. .............................................. 269/32

[58] Field of Search ....................... 269/32, 20, 27, 296

[56] References Cited

U.S. PATENT DOCUMENTS 2,417,625 3/1947 Bates .................................... 269/32

3,941,362 3/1976 Arnold et al. ........................ 269/32

FOREIGN PATENT DOCUMENTS 575754 3/1946 United Kingdom .................. 269/32

*Primary Examiner*—Robert C. Watson

*Attorney, Agent, or Firm*—Browdy and Neimark

[57] ABSTRACT

An air operated vice includes a base having a hollow interior. A pair of jaws, one being fixed and one being movable, are provided on an upper surface of the vice. One or more cylinders are provided in the hollow interior of the base. A rear end wall of the cylinders is pivotally connected to the base. A lever is pivotally provided in the base about a pivot axle. An upper end of the lever is engaged with a lower surface of the mobile jaw. A length of an upper portion of the lever is shorter than a length of a lower portion of the lever. A lower end of the lever is pivotally connected to a free end of the piston rod so that the lever is actuated to rotate by the piston rod and the mobile jaw is actuated to move by the lever.

6 Claims, 3 Drawing Sheets

AIR OPERATED VICE

BACKGROUND OF THE INVENTION

The present invention relates to a vice, and more particularly to an air operated vice.

A two-piston double acting type vice is disclosed in U.S. Pat. No. 4,070,010 (filed Dec. 8, 1976, Ser. No. 748,808, "VICE FOR A MACHINE TOOL BED"). The vice comprises two cylindrical chambers, two pistons, two piston rods and two independent fluids, either air-oil or oil-oil. A front piston rod is directly engaged with the jaw support wall of the carriage by means of a stop flange. The disadvantage of this vice is the requirement of two completely separate systems, either one hydraulic and one pneumatic system (air-oil) or two hydraulic systems (oil-oil). The air-oil system is complex and the oil-oil system is expensive.

The present invention has arisen to mitigate and/or obviate the afore-described disadvantages of the conventional vice.

SUMMARY OF THE INVENTION

The primary objective of the present invention is to provide an air operated vice which produces an enlarged output with a relatively low input.

In accordance with one aspect of the present invention, there is provided an air operated vice which includes a base having a hollow interior. A pair of jaws, one being fixed and one being movable, are provided on an upper surface of the vice. One or more cylinders are provided in the hollow interior of the base. A rear end wall of the cylinders is pivotally connected to the base. A lever is pivotally provided in the base about a pivot axle. An upper end of the lever is engaged with a lower surface of the mobile jaw. A length of an upper portion of the lever is shorter than a length of a lower portion of the lever. A lower end of the lever is pivotally connected to a free end of the piston rod so that the lever is actuated to rotate by the piston rod and the mobile jaw is actuated to move by the lever.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
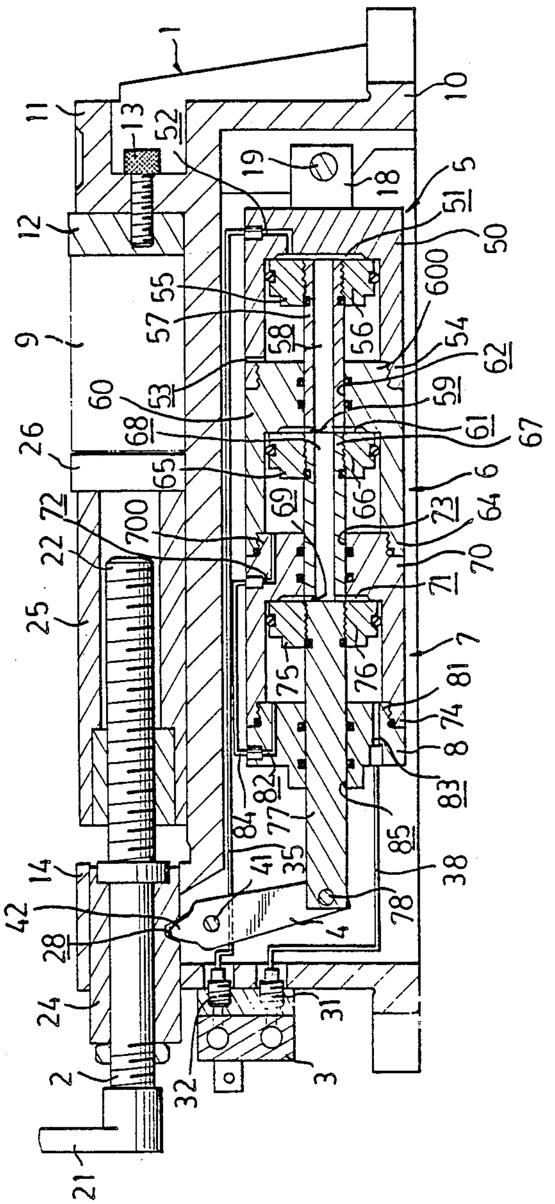
FIG. 1 is a cross-sectional view of an air operated vice in accordance with the present invention.

Referring to the drawings and initially to FIG. 1, the air operated vice in accordance with the present invention comprises generally a vice body 1 with a series of actuating mechanisms, such as pneumatic cylinders 5, 6 and 7 provided therein.

The vice body 1 comprises an elongated, hollow base portion 10. A fixed jaw 12 is fixed by a screw 13 to a wall portion 11 which is integrally formed on an upper and right side of the base portion 10. A ferrule 24 is fixed around a middle portion of a threaded bar 2 and is longitudinally and rotatably supported within a support 14 which is formed on an upper and left side of the base portion 10. The threaded bar 2 has a handle portion 21 provided on a left end thereof. A slide block 25 is threadedly connected to a threaded end 22 of the threaded bar 2. A mobile jaw 26 is fixed on a right end of the slide block 25 so that the mobile jaw 26 is movable toward or away from the fixed jaw 12 by a respective relative movement of the slide block 25 along the threaded bar 2. A notch 28 is formed in a lower surface of the ferrule 24. The ferrule 24 is longitudinally slidable within the support 14.

A two-way valve 3 having two nozzles 31, 32 is provided on a left end of the base portion 10 of the vice body 1. The two-way valve 3 is connected to a pressurized air supply, such as an air compressor (not shown). A lever 4 is pivotally supported by a pivot axle 41 which is fixed to the base portion 10 of the vice body 1. An upper end 42 of the lever 4 is substantially tooth shaped and is engaged within the notch 28 of the ferrule 24.

Figure 2:
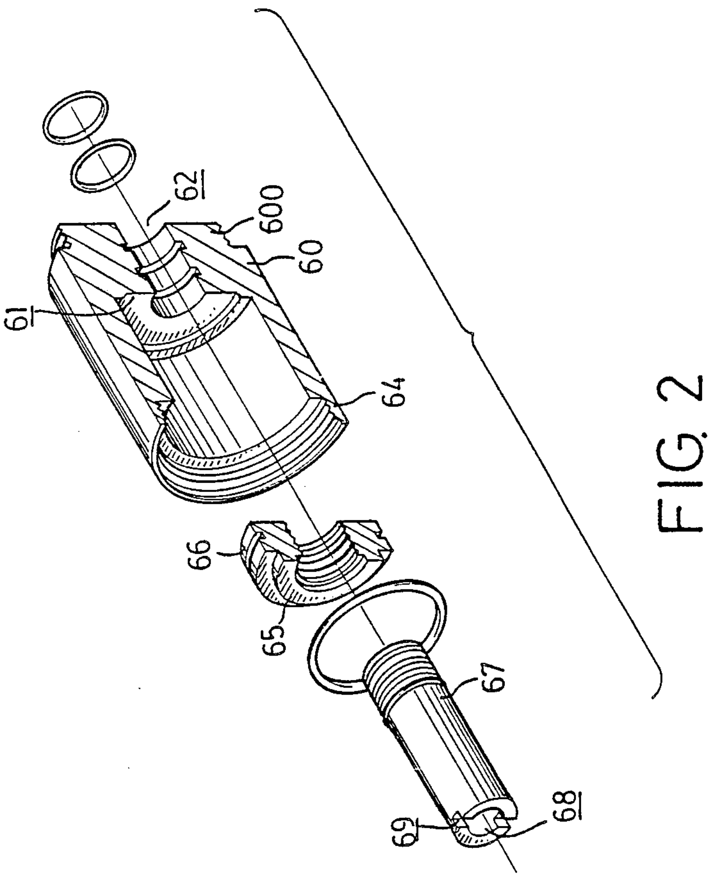
FIG. 2 is an exploded view illustrating a piston, a piston rod and a cylinder.

As shown in the drawings, and particularly in FIGS. 1 and 2, a right cylinder 5, a middle cylinder 6 and a left cylinder 7 are provided and coupled together in series in the base portion 10 of the vice body 1. Each of the cylinders 5, 6 and 7 is substantially a cylindrical body with an end wall 50, 60 and 70 provided on a right end thereof. A circular recess 51, 61 or 71 is formed in a left surface of each end wall. A center hole 62, 73 is formed in each end wall 60, 70 of the middle and the left cylinders 6, 7. An extension 18 is integrally provided on a right end of the right cylinder 5. The extension 18 is pivotally connected to the base portion 10 at a pivot axle 19. A substantially L-shaped air hole 52, 72 is formed in each of the end walls 50, 70 of the right and the left cylinders 5, 7. The air hole 52 communicates at one end with the circular recess 51 and is connected at the other end to the nozzle 32 of the two-way valve 3 by an air pipe 35. A shoulder portion 54, 64 and 74 with an inner thread is provided at a left end of the respective cylinders 5, 6, and 7. An air hole 53 is formed in the right cylinder 5 adjacent to the shoulder portions 54 thereof.

A piston 56, 66 and 76 and a piston rod 57, 67 and 77 are provided in each of the cylinders 5, 6 and 7 and are threadedly connected together and slidable in the respective cylinder 5, 6 and 7. A sealing ring is provided between each piston and each piston rod. The pistons 56, 66 and 76 are slidable in the respective cylinders 5, 6 and 7 and the piston rods 57, 67 are slidable in the respective center holes 62, 73 of the end walls 60, 70. A sealing ring is provided on an outer peripheral surface of each of the pistons 56, 66 and 76. A longitudinal hole 58, 68 and a vertical hole 59, 69 are formed in the respective piston rods 57, 67 so that the circular recesses 51, 61 and 71 are communicated with one another. A reduced diameter portion 55, 65 and 75 is formed on a left surface of each of the respective pistons 56, 66 and 76. A reduced diameter portion 600, 700 is formed on a right end of each of the respective end walls 60, 70 so as to be threadedly connected to the respective shoulder portions 54, 64. A sealing ring is provided on the reduced diameter portion 700 of the end wall 70 for providing an air tight seal between the middle and the left cylinders 6 and 7.

An end cap 8 with a reduced diameter portion 81 is threadedly connected to the shoulder 74 of the left cylinder 7 and a sealing ring is provided therebetween. A substantially L-shaped air hole 82 and a straight air hole 83 are formed in the end cap 8. The straight air hole 83 is connected to the nozzle 31 by an air pipe 38. An air pipe 84 is connected between the air holes 72 and 82. The piston rod 77 passes through and is slidable in a center hole 85 of the end cap 8. Two sealing rings are provided in each of the center holes 62, 73 and 85 of the respective end walls 60, 70 and the end cap 8. A left end of the piston rod 77 is pivotally connected to a lower end of the lever 4 at a pivot axle 78. The left ends of the piston rods 57, 67 contact and bear against the respective right ends of the piston rods 67, 77.

As shown in FIG. 1, the pistons 56, 66 and 76 are in the retracted positions. A work piece 9 is loosely positioned between the jaws 12 and 26. The ferrule 24, the sliding block 25 and the mobile jaw 26 are moved to a leftmost position.

Figure 3:
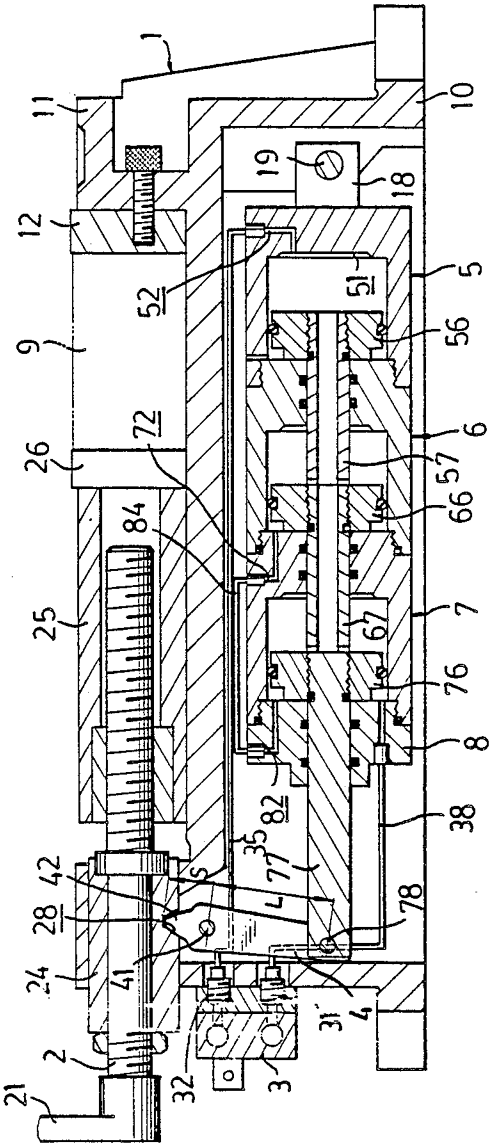
FIG. 3 is a cross-sectional view similar to FIG. 1, illustrating a working position of the vice.

When the work piece 9 is desired to be clamped, pressurized air with a predetermined pressure is supplied from the nozzle 32 of the two-way valve 3 to the air hole 52. Then, the pressurized air flows into the circular recesses 61, 71 via the circular recess 51, the longitudinal holes 58 and 68 and the vertical holes 59 and 69 so that the pistons 56, 66 and 76 are pushed leftward toward the position as shown in FIG. 3. Simultaneously, the lower end of the lever 4 is pushed leftward and the upper end thereof is pushed rightward so that the mobile jaw 26 is pushed rightward to clamp the work piece 9. When the pistons are to be retracted, pressurized air is supplied from the nozzle 31 to the air hole 83; part of the pressurized air flows through the air hole 82, the air pipe 84 and the air hole 72 into the cylinder 6 so that the pistons 66 and 76 are pushed rightward. The only biased force to be overcome by the pressure of the pressurized air is the friction force between the pistons 56, 66, 76 and the inner surfaces of the cylinders 5, 6, 7. Therefore, a very low pressure, such as 25 psi, is more than enough.

As shown in FIG. 3, the distance L between the pivot axles 41 and 78 is three times as large as the distance S between the pivot axle 41 and the upper end 42 of the lever 4. According to the principle of lever, an output force of the upper end 42 of the lever 4 is three times as large as the force produced by the three cylinders 5, 6 and 7. Obviously, the three cylinders 5, 6 and 7 produce a force three times as large as the force produced by one single cylinder. Consequently, the output force of the upper end 42 of the lever 4 is nine times as large as the force produced by one single cylinder. It is preferable that the distance L is more than twice as long as the distance S.

Accordingly, the air operated vice in accordance with the present invention can easily obtain a resultant output force which is nine times greater than the input force. Relatively, for a predetermined output force, the pressure of the pressurized air can be lowered; i.e., an identical result can be achieved by a relatively low input force.

Although, obviously, there are three cylinders provided for the air operated vice in accordance with the present invention, the present invention is not intended to limit the number of the cylinders. For example, if there is only one cylinder provided, a force three times greater than the input force can be achieved by the air operated vice in accordance with the present invention. Alternatively, the mobile jaw 26 is a long beam and can be directly actuated by the lever 4 without the threaded bar 22 and the ferrule 24.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An air operated vice comprising a base having a hollow interior; a fixed jaw being provided on an upper surface of said vice; a mobile jaw being slidably supported on said upper surface of said vice opposite to said fixed jaw; a cylinder with a piston and a piston rod being provided in said hollow interior of said base; a rear end wall of said cylinder being pivotally connected to said base; an end cap being provided on an open end of said cylinder; said piston rod of said cylinder being protruded out of said end cap; a lever being pivotally provided in said base about a pivot axle and being arranged so that an upper end of said lever is engaged with a lower surface of said mobile jaw, a length of an upper portion of said lever which is above said pivot axle being shorter than a length of a lower portion of said lever which is below said pivot axle, a lower end of said lever being pivotally connected to a free end of said piston rod of said cylinder so that said lever is actuated to rotate by said piston rod of said cylinder; and said mobile jaw being actuated to move by said lever.

2. An air operated vice according to claim 1, wherein a notch is formed in said lower surface of said mobile jaw, said upper end of said lever is engaged with said notch.

3. An air operated vice according to claim 1, wherein a circular recess is formed in an inner surface of said rear end wall of said cylinder; a first air hole is formed in said rear end wall of said cylinder for supplying pressurized air from a two-way valve into a rear end of said cylinder, said first air hole is communicated with said circular recess; and a second air hole is formed in said end cap for supplying pressurized air from said two-way valve into a front end of said cylinder so that said piston is actuated to move by said pressurized air.

4. An air operated vice comprising a base having a hollow interior; a fixed jaw being fixed on an upper surface of said vice; a mobile jaw being slidably supported on said upper surface of said vice opposite to said fixed jaw; two or more cylinders each with a piston and a piston rod being provided in series within said hollow interior of said base; a rear end wall of a rearmost cylinder being pivotally connected to said base; an end cap being provided on an open end of a frontmost cylinder; said piston rod of said frontmost cylinder being protruded out of said end cap; a lever being pivotally provided in said base about a pivot axle and being arranged so that an upper end of said lever is engaged with a lower surface of said mobile jaw, a length of an upper portion of said lever being shorter than a length of a lower portion of said lever, a lower end of said lever being pivotally connected to a free end of said piston rod of said frontmost cylinder so that said lever is actuated to rotate by said piston rods of said cylinders; said mobile jaw being actuated to move by said lever; a circular recess being formed in an inner surface of said rear end wall of each said cylinder; a first air hole being formed in said rear end wall of said rearmost cylinder for supplying pressurized air from a two-way valve into a rear end of said cylinder, said first air hole being communicated with said circular recesses; a second air hole being formed in said end cap for supplying pressurized air from said two-way valve into a front end of said cylinder so that said pistons are actuated to move by said pressurized air.

5. An air operated vice according to claim 4, wherein a third air hole is formed in said end cap; a fourth air hole is formed in an end wall of a third cylinder which is coupled to a rear end of said frontmost cylinder; said third air hole and said fourth air hole are connected by an air pipe so that spaces of said frontmost cylinder and of said third cylinder in front of said pistons are communicated with each other.

6. An air operated vice according to claim 4, wherein a longitudinal hole is provided in each said piston rod except that of said frontmost cylinder and a vertical hole is provided in a front end of each said piston rod except that of said frontmost cylinder; and said vertical holes are communicated with said circular recesses when said pistons are in retracted positions.

* * * * *